(12) United States Patent
Xiang et al.

(10) Patent No.: US 10,677,919 B2
(45) Date of Patent: Jun. 9, 2020

(54) SELF-POSITIONING SYSTEM AND SELF-POSITIONING IDENTIFICATION METHOD OF DEEPWATER UNDERWATER ROBOT OF IRREGULAR DAM SURFACE OF RESERVOIR

(71) Applicant: NANJING HYDRAULIC RESEARCH INSTITUTE, Nanjing (CN)

(72) Inventors: Yan Xiang, Nanjing (CN); Zhuo Li, Nanjing (CN); Jinbao Sheng, Nanjing (CN); Yunqing Tang, Nanjing (CN); Chengdong Liu, Nanjing (CN); Guangya Fan, Nanjing (CN); Haifei Sha, Nanjing (CN); Xiaolei Zhan, Nanjing (CN); Kai Zhang, Nanjing (CN); Guangze Shen, Nanjing (CN)

(73) Assignee: NANJING HYDRAULIC RESEARCH INSTITUTE, Nanjing (CN)

( * ) Notice: Subject to any disclaimer, the term of this patent is extended or adjusted under 35 U.S.C. 154(b) by 306 days.

(21) Appl. No.: 15/938,363

(22) Filed: Mar. 28, 2018

(65) Prior Publication Data
US 2019/0235074 A1    Aug. 1, 2019

(30) Foreign Application Priority Data
Feb. 1, 2018   (CN) .......................... 2018 1 0101724

(51) Int. Cl.
*G01S 15/08*      (2006.01)
*B63G 8/00*       (2006.01)
(Continued)

(52) U.S. Cl.
CPC .............. *G01S 15/08* (2013.01); *B63G 8/001* (2013.01); *B63G 8/24* (2013.01); *E02B 7/00* (2013.01);
(Continued)

(58) Field of Classification Search
CPC .......... G01S 15/08; G01S 15/46; G01S 15/88; G01C 21/20; E02B 7/04; E02B 7/00;
(Continued)

(56) References Cited

U.S. PATENT DOCUMENTS

| 3,195,677 | A | * | 7/1965 | Hillery | ................. | G10K 11/205 |
| | | | | | | 181/175 |
| 4,104,634 | A | * | 8/1978 | Gillard | .................... | G01S 13/75 |
| | | | | | | 342/33 |
| 2019/0235074 | A1 | * | 8/2019 | Xiang | .................. | G05D 1/0206 |

FOREIGN PATENT DOCUMENTS

CN          108362287 A    *   8/2018    ............. G01S 15/08

OTHER PUBLICATIONS

Wang et al., May 2011, Three Gorges Dam stability monitoring with time-series InSAR image analysis, pp. 720-732 (Year: 2011).*

* cited by examiner

*Primary Examiner* — Daniel Pihulic
(74) *Attorney, Agent, or Firm* — AKC Patents, LLC; Aliki K. Collins

(57) ABSTRACT

The present invention provides a self-positioning system of a deepwater underwater robot of an irregular dam surface of a reservoir, including cross reflection metal plates arranged on the irregular dam surface, and an underwater robot provided with a control motherboard, a water level indicator and a sonar system, wherein the water level indicator and the sonar system are respectively connected with the control motherboard, and the control motherboard is connected with a computer via a cable. The cross reflection metal plate has known coordinates and has four quadrants. A sonar signal emitted by the sonar system is reflected by the cross reflection metal plate to generate sonar reflection signals of four quadrants, and the sonar signals in the effective quadrants correspond to known coordinate parameters of the cross reflection metal plate so as to obtain the horizontal distance between the underwater robot and the irregular dam surface. The water level indicator is used for calculating the vertical position of the underwater robot. The computer calculates (Continued)

accurate positioning of the underwater robot according to the horizontal position and the vertical position. The present invention has the beneficial effects of being able to accurately obtain the positioning coordinates of the underwater robot in the deepwater of the irregular dam surface of the reservoir.

10 Claims, 2 Drawing Sheets

(51) Int. Cl.
| | | |
|---|---|---|
| *B63G 8/24* | (2006.01) | |
| *E02B 7/00* | (2006.01) | |
| *G05D 1/02* | (2020.01) | |
| *E02B 7/04* | (2006.01) | |
| *G01S 15/88* | (2006.01) | |
| *G01S 15/46* | (2006.01) | |
| *G01C 21/20* | (2006.01) | |
| *G05D 1/04* | (2006.01) | |
| *E02B 17/00* | (2006.01) | |

(52) U.S. Cl.
CPC ............... *E02B 7/04* (2013.01); *G01C 21/20* (2013.01); *G01S 15/46* (2013.01); *G01S 15/88* (2013.01); *G05D 1/0206* (2013.01); *B63G 2008/004* (2013.01); *E02B 17/0034* (2013.01); *G05D 1/048* (2013.01)

(58) Field of Classification Search
CPC .. E02B 17/0034; G05D 1/0206; G05D 1/048; B63G 8/001; B63G 8/24; B63G 2008/004
See application file for complete search history.

SELF-POSITIONING SYSTEM AND SELF-POSITIONING IDENTIFICATION METHOD OF DEEPWATER UNDERWATER ROBOT OF IRREGULAR DAM SURFACE OF RESERVOIR

CROSS REFERENCE TO RELATED CO-PENDING APPLICATIONS

This application claims the benefit of Chinese National patent application Serial No. 201810101724.3 filed Feb. 1, 2018 and entitled "SELF-POSITIONING SYSTEM AND SELF-POSITIONING IDENTIFICATION METHOD OF DEEPWATER UNDERWATER ROBOT OF IRREGULAR DAM SURFACE OF RESERVOIR", the contents of which are expressly incorporated herein by reference.

FIELD OF THE INVENTION

The present invention relates to the technical field of hydraulic engineering, and more particularly to a self-positioning system and a self-positioning identification method of a deepwater underwater robot of an irregular dam surface of a reservoir.

BACKGROUND OF THE INVENTION

Underwater robots have achieved tremendous practical applications in underwater environment detection, monitoring, underwater target capture and underwater facility operations and the like. A manual method for overhauling a deepwater dam is very difficult. The overhaul via an underwater robot has become a main choice. Accurate positioning of the underwater robot is the key to the underwater overhaul of a dam with irregular dam surfaces, of a deepwater reservoir. An existing underwater robot positioning system cannot be directly applied to the overhaul of the irregular dam surfaces of the reservoir, as the reservoir dam is constructed in a deep valley area where the water level is high and the water is turbid, and the requirement for the positioning accuracy of the underwater robot is very high, the influence of sound wave reflection on a conventional sonar system for use underwater such as in seas and the like is very small, while sound wave reflection sources of the irregular dam surfaces of a reservoir in a deep valley area are numerous, for example, dam types, hoists, gates, sound of water flow, noise, embedded parts of dam surfaces and other buildings generate greater influence on the sound waves, and thus different quadrant reflection devices must be used to reduce the reflection and the multipath effect.

SUMMARY OF THE INVENTION

The present invention overcomes the shortcomings in the prior art and provides a self-positioning system of a deepwater underwater robot of an irregular dam surface of a reservoir. Coordinate positioning plates are arranged on the irregular dam surface, a sonar system tests the distances between the underwater robot and different coordinate positioning plates, and the sonar system checks the distances among different coordinate positioning, so that the horizontal distance between the underwater robot and the irregular dam surface can be accurately determined; the vertical distance of the underwater robot is determined via a water level indicator, and finally positioning coordinates in the irregular dam surface of the reservoir are obtained accurately. Another objective of the present invention is to provide a self-positioning identification method of the deepwater underwater robot of the irregular dam surface of the reservoir.

The objectives of the present invention are achieved by the following technical solution. A self-positioning system of a deepwater underwater robot of an irregular dam surface of a reservoir includes cross reflection metal plates arranged on an upstream surface of the irregular dam surface, an underwater robot provided with a control motherboard, a water level indicator and a sonar system. The water level indicator and the sonar system are respectively connected with the control motherboard, and the control motherboard is connected with a computer via a cable. The cross reflection metal plate has known coordinates and has four quadrants. A sonar signal emitted by the sonar system is reflected by the cross reflection metal plate to generate sonar reflection signals of four quadrants, and the sonar signals in the effective quadrants correspond to known coordinate parameters of the cross reflection metal plate so as to obtain the horizontal distance between the underwater robot and the irregular dam surface. The water level indicator is used for calculating the vertical distance between the underwater robot and the water surface. The computer calculates accurate positioning of the underwater robot according to the horizontal distance, the vertical distance, and the coordinates of the cross reflection metal plate on the irregular dam surface.

Further, the cross reflection metal plates are arranged on the surface along the horizontal direction and the vertical direction, the cross reflection metal plates are arranged in a lattice shape, and the horizontal distance and the vertical distance of the adjacent cross reflection metal plates are 5-6 m. Further, the lower part of the water level indicator and the lower part of the underwater robot are located on the same horizontal plane. Further, the cross reflection metal plate has a length of 35-40 cm, a thickness of 0.3-0.5 cm and a width of 15-20 cm. Further, the irregular dam surface of the reservoir is located in a deep valley area.

A self-positioning identification method of a deepwater underwater robot of an irregular dam surface of a reservoir is provided, the method using a system including cross reflection metal plates arranged on an upstream surface of the irregular dam surface, an underwater robot provided with a control motherboard, a water level indicator and a sonar system, wherein the water level indicator and the sonar system are respectively connected with the control motherboard, and the control motherboard is connected with a computer via a cable, the method including the following steps:

first step, the cross reflection metal plate has known coordinates and has four quadrants, a sonar signal emitted by the sonar system is reflected by the cross reflection metal plate to generate sonar reflection signals of four quadrants, and the sonar signals in the effective quadrants correspond to known coordinate parameters of the cross reflection metal plate so as to obtain the horizontal distance between the underwater robot and the irregular dam surface;

second step, the water level indicator is used for calculating the vertical distance between the underwater robot and the water surface; and third step, the computer calculates accurate positioning of the underwater robot according to the horizontal distance, the vertical distance, and the coordinates of the cross reflection metal plate on the irregular dam surface.

Further, the cross reflection metal plates are arranged on the irregular dam surface along the horizontal direction and the vertical direction, the cross reflection metal plates are arranged in a lattice shape, and the horizontal distance and the vertical distance of the adjacent cross reflection metal plates are 5-6 m. Further, the lower part of the water level indicator and the lower part of the underwater robot are located on the same horizontal plane. Further, the cross reflection metal plate has a length of 35-40 cm, a thickness of 0.3-0.5 cm and a width of 15-20 cm. Further, the irregular dam surface of the reservoir is located in a deep valley area.

The present invention has the following beneficial effects: Compared with self-positioning of an underwater robot in the prior art, as the irregular dam surface of the reservoir is constructed in the deep valley area where the water level is high and the water is turbid, and the requirement for the multi-positioning accuracy is very high, the cross reflection metal plates are installed on the upstream surface of the irregular dam surface, the cross reflection metal plates divide the sonar signals into four quadrants, the sonar signals can be effectively distinguished via the four quadrants, thereby reducing the reflection and the multipath effect of the waves, the cross reflection metal plates and the water level indicator of the underwater robot have known coordinates, and thus the positioning coordinates of the underwater robot can be comprehensively determined via the sonar system and the water level indicator installed on the underwater robot.

REFERENCE SIGNS 1. irregular dam surface; 2. cross reflection metal plate; 3. underwater robot; 4. sonar system; 5. water level indicator; 6. control motherboard; 7. cable; 8. Computer.

DETAILED DESCRIPTION OF THE INVENTION

The technical solution of the present invention will be further illustrated below via specific embodiments.

Figure 1:
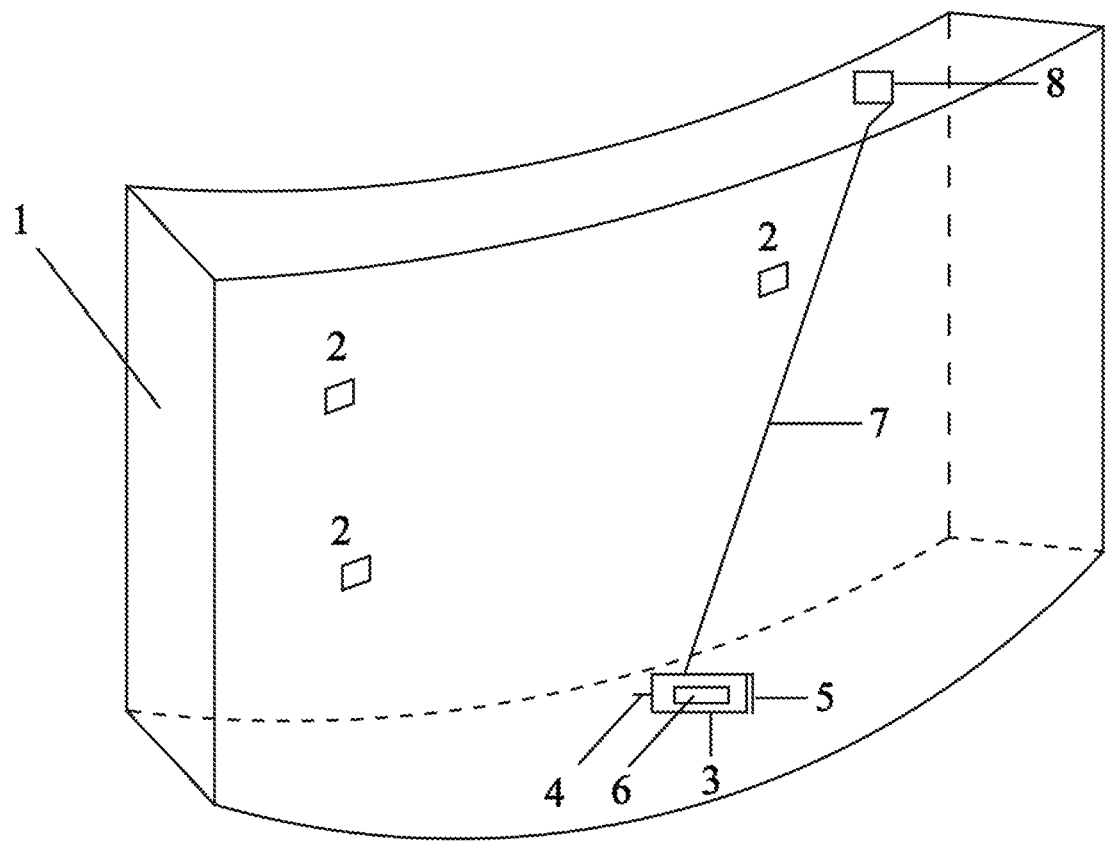
FIG. 1 is a structural schematic diagram of the present invention.

Referring to FIG. 1, a self-positioning system of a deepwater underwater robot of an irregular dam surface of a reservoir includes an irregular dam surface 1, cross reflection metal plates 2, an underwater robot 3, a sonar system 4, a water level indicator 5, a control motherboard 6, a cable 7, and a computer 8.

Figure 2:
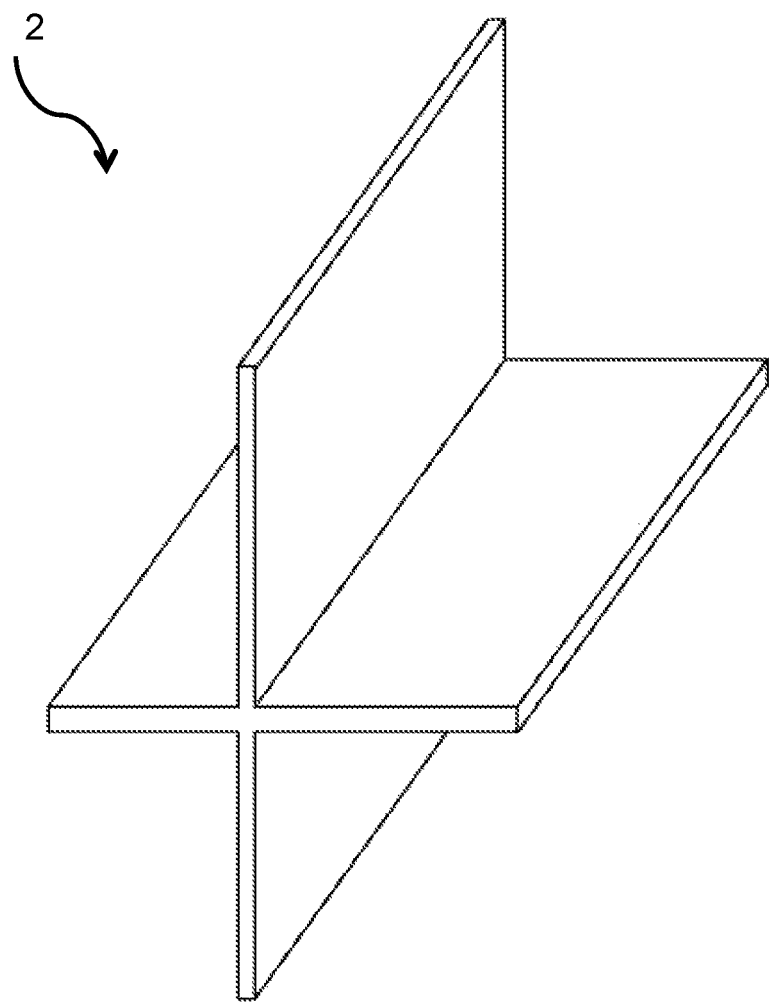
FIG. 2 is a schematic diagram of a cross reflection metal plate.

The irregular dam surface 1 is located in a deep valley area, the water of the reservoir area is relatively turbid, the cross reflection metal plates 2 are arranged on an upstream surface of the irregular dam surface 1, the cross reflection metal plates 2 are arranged along the horizontal direction and the vertical direction respectively, the cross reflection metal plates 2 are arranged in a lattice shape, and the horizontal distance and the vertical distance are 5 m, the coordinates of the cross reflection metal plates 2 are known parameters, the cross reflection metal plate 2 is composed of one horizontal and one longitudinal metal plate vertical to each other, that is, the cross reflection metal plate 2 has four quadrants, as shown in FIG. 2. A sonar signal emitted by the sonar system 4 is reflected by the cross reflection metal plate 2 to generate sonar reflection signals of four quadrants, and the sonar signals in the effective quadrants correspond to known coordinate parameters of the cross reflection metal plate so as to obtain the horizontal position of the underwater robot, and the cross reflection metal plate 2 has a length of 40 cm, a thickness of 0.5 cm and a width of 20 cm.

The sonar system 4, the water level indicator 5 and the control motherboard 6 are installed in the underwater robot 3, the lower part of the water level indicator 4 and the lower part of the underwater robot 3 are located on the same horizontal plane, the water level indicator 4 is connected with the computer 8 via the cable 7, the model number of the water level indicator 4 is BAG-4500s, the meter full scale is 3 MPa, the control motherboard 6 of the underwater robot 3 is composed of a controller, a communication interface, a power circuit and an MCU, the model number of the controller is ATmega8L, the model number of the communication interface is YN1100, the model number of the MCU is SWN-01, the model number of the cable is DBXH4× 0.30+1×0.20, and the depth monitoring of the underwater robot 3 is achieved via the reading of the water level indicator 4 installed in the underwater robot 3.

The sonar system 4 is connected with the control motherboard 6, and the control motherboard 6 is connected with the computer 8 via the cable 7; and the computer 8 reads the positioning coordinates and the analysis data of the underwater robot 3.

A self-positioning identification method of a deepwater underwater robot of an irregular dam surface of a reservoir is provided. The cross reflection metal plate 2 has known coordinates and has four quadrants. A sonar signal emitted by the sonar system 4 is reflected by the cross reflection metal plate 2 to generate sonar reflection signals of four quadrants, and the sonar signals in the effective quadrants correspond to known coordinate parameters of the cross reflection metal plate 2 so as to obtain the horizontal distance between the underwater robot 3 and the irregular dam surface 1. The water level indicator 5 is used for calculating the vertical distance between the underwater robot 3 and the water surface. The computer calculates accurate positioning of the underwater robot according to the horizontal distance, the vertical distance, and the coordinates of the cross reflection metal plate on the irregular dam surface, to obtain accurate positioning coordinates of the underwater robot 3 in the muddy water of the deep valley area.

For example, the two-point coordinates of the cross reflection metal plate 2 are A $(x_1, y_1, z_1)$, B $(x_2, y_2, z_2)$, and C $(x_3, y_3, z_3)$, the coordinate of the underwater robot 3 is $(x_4, y_4, z_4)$, the distance between the underwater robot 3 and the point A is l, the distance between the underwater robot 3 and the point B is m, the distance between the underwater robot 3 and the point C is n, and the coordinate of the underwater robot 3 is:

$$\begin{cases} x_4 = \frac{A(y_3 - y_1) - B(y_2 - y_1)}{2[(x_2 - x_1)(y_3 - y_1) - (x_3 - x_1)(y_2 - y_1)]} \\ x_4 = \frac{A - 2(x_2 - x_1)x_5}{2(y_2 - y_1)} \end{cases}$$

$$\begin{cases} A = l^2 - m^2 + 2z_4(z_1 - z_2) + z_2^2 - z_1^2 - y_1^2 + y_2^2 \\ B = l^2 - n^2 + 2z_4(z_1 - z_3) + z_3^2 - z_1^2 - y_1^2 + y_3^2 \end{cases}$$

In the formula, $x_1$ represents an abscissa of a cross reflection metal plate A and is known;

$y_1$ represents an ordinate of the cross reflection metal plate A and is known;

$z_1$ represents an applicate of the cross reflection metal plate A and is known;

$x_2$ represents an abscissa of the cross reflection metal plate B and is known;

$y_2$ represents an ordinate of the cross reflection metal plate B and is known;

$z_2$ represents an applicate of the cross reflection metal plate B and is known;

$x_3$ represents an abscissa of the cross reflection metal plate C and is known;

$y_3$ represents an ordinate of the cross reflection metal plate C and is known;

$z_3$ represents an applicate of the cross reflection metal plate C and is known;

$x_4$ represents an abscissa of the underwater robot;

$y_4$ represents an ordinate of the underwater robot;

$z_4$ represents an applicate of the underwater robot;

$z_4$ represents the reading of the water level indicator;

l represents the distance between the underwater robot and the point A;

m represents the distance between the underwater robot and the point B;

n represents the distance between two coordinate positioning plates.

Several embodiments of the present invention have been described. Nevertheless, it will be understood that various modifications may be made without departing from the spirit and scope of the invention. Accordingly, other embodiments are within the scope of the following claims.

What is claimed is:

1. A self-positioning system of a deepwater underwater robot of an irregular dam surface of a reservoir, comprising:
   cross reflection metal plates arranged on an upstream surface of the irregular dam surface, an underwater robot provided with a control motherboard, a water level indicator, and a sonar system;
   wherein the water level indicator and the sonar system are respectively connected with the control motherboard, and the control motherboard is connected with a computer via a cable;
   wherein each cross reflection metal plate has known coordinates and has four quadrants;
   wherein a sonar signal emitted by the sonar system is reflected by the cross reflection metal plate to generate sonar reflection signals of four quadrants, and the sonar signals in the effective quadrants correspond to known coordinate parameters of the cross reflection metal plate so as to obtain the horizontal distance between the underwater robot and the irregular dam surface;
   wherein the water level indicator is used for calculating the vertical distance between the underwater robot and the water surface; and
   wherein the computer calculates accurate positioning of the underwater robot according to the horizontal distance, the vertical distance, and the coordinates of the cross reflection metal plate on the irregular dam surface.

2. The self-positioning system of the deepwater underwater robot of the irregular dam surface of the reservoir of claim 1, wherein the cross reflection metal plates are arranged on the surface along the horizontal direction and the vertical direction, the cross reflection metal plates are arranged in a lattice shape, and the horizontal distance and the vertical distance of the adjacent cross reflection metal plates are 5-6 m.

3. The self-positioning system of the deepwater underwater robot of the irregular dam surface of the reservoir of claim 1, wherein the lower part of the water level indicator and the lower part of the underwater robot are located on the same horizontal plane.

4. The self-positioning system of the deepwater underwater robot of the irregular dam surface of the reservoir of claim 1, wherein the cross reflection metal plate has a length of 35-40 cm, a thickness of 0.3-0.5 cm and a width of 15-20 cm, and the surface of the metal plate is smooth and is coated with silver-white reflective metal paint.

5. The self-positioning system of the deepwater underwater robot of the irregular dam surface of the reservoir of claim 1, wherein the irregular dam surface of the reservoir is located in a deep valley area with turbid water and numerous reflection sources.

6. A self-positioning identification method of a deepwater underwater robot of a gravity dam by using the system of claim 1, wherein the system comprises cross reflection metal plates arranged on an upstream surface of the irregular dam surface, and an underwater robot provided with a control motherboard, a water level indicator and a sonar system, wherein the water level indicator and the sonar system are respectively connected with the control motherboard, and the control motherboard is connected with a computer via a cable, the method comprising the following steps:
   first step, the cross reflection metal plate has known coordinates and has four quadrants, a sonar signal emitted by the sonar system is reflected by the cross reflection metal plate to generate sonar reflection signals of four quadrants, and the sonar signals in the effective quadrants correspond to known coordinate parameters of the cross reflection metal plate so as to obtain the horizontal distance between the underwater robot and the irregular dam surface;
   second step, the water level indicator is used for calculating the vertical distance between the underwater robot and the water surface; and
   third step, the computer calculates accurate positioning of the underwater robot according to the horizontal distance, the vertical distance, and the coordinates of the cross reflection metal plate on the irregular dam surface.

7. The self-positioning identification method of the deepwater underwater robot of the irregular dam surface of claim 6, wherein the cross reflection metal plates are arranged on the irregular dam surface along the horizontal direction and the vertical direction, the cross reflection metal plates are arranged in a lattice shape, and the horizontal distance and the vertical distance of the adjacent cross reflection metal plates are 5-6 m.

8. The self-positioning identification method of the deepwater underwater robot of the irregular dam surface of claim 6, wherein the lower part of the water level indicator and the lower part of the underwater robot are located on the same horizontal plane.

9. The self-positioning identification method of the deepwater underwater robot of the irregular dam surface of claim 6, wherein the cross reflection metal plate has a length of 35-40 cm, a thickness of 0.3-0.5 cm and a width of 15-20 cm.

10. The self-positioning identification method of the deepwater underwater robot of the irregular dam surface of claim 6, wherein the irregular dam surface of the reservoir is located in a deep valley area with turbid water and numerous reflection sources.

* * * * *